United States Patent [19]

Alvarez et al.

[11] 3,723,976

[45] Mar. 27, 1973

[54] MEMORY SYSTEM WITH LOGICAL AND REAL ADDRESSING

[75] Inventors: Joseph A. Alvarez, Monrovia; Robert P. Barner, Jr., Rockville, both of Md.

[73] Assignee: International Business Machines Corporation, Armonk, N.Y.

[22] Filed: Jan. 20, 1972

[21] Appl. No.: 219,362

[52] U.S. Cl. ....................................340/172.5
[51] Int. Cl. ....................................G06f 3/00
[58] Field of Search ....................................340/172.5

[56] References Cited

UNITED STATES PATENTS

| | | | |
|---|---|---|---|
| R26,429 | 8/1968 | Kaufman et al. | 340/172.5 |
| 3,388,381 | 6/1968 | Prywes et al. | 340/172.5 |

*Primary Examiner*—Harvey E. Springborn
*Attorney*—J. Jancin, Jr. et al.

[57] ABSTRACT

A memory system is disclosed for use in a multiprocessing environment where each processor has associated with it a buffer memory and means are provided for one buffer to retain a modified copy of data. The contents of the buffer memory may be accessed by either real or logical addresses. Address translation means are provided to translate logical addresses. A fetch directory is provided to keep track of the data in cache. The fetch directory entries are accessed by both logical and real portions of the desired data address. Means are provided to insure that only one copy of data is maintained in the buffer although it may be entered at several cache locations dependent upon the logical address which last fetched the data.

11 Claims, 7 Drawing Figures

MEMORY SYSTEM WITH LOGICAL AND REAL ADDRESSING

BACKGROUND OF THE INVENTION

This invention relates generally to the field of digital computers and more specifically, to the area of memory control within a computer.

In a system with a storage hierarchy, selected blocks of data for main storage are stored in a local buffer or cache for fast access by the CPU. When the processor requests new data, the system first checks the buffer memory to determine whether it is available, and if it is, the data is provided to the processor. In the event the data is not available in the buffer memory the data is retrieved from the main memory.

In systems such as this where the buffer memory may be accessed with both logical and real addresses, problems are encountered in identifying whether the data represented by the logical and real address is located in the buffer memory. Prior art systems, such as that described in the Anderson, et al. application "Virtual Memory System" Ser. No. 158,180 filed June 30, 1971, assigned to the same assignee as the present application, have overcome some of these problems by requiring that an address translation be accomplished on all logical addresses and that the data stored in the buffer be kept track of by entering a portion of its real address in a buffer directory. In this manner, once an address translation is accomplished and the real address is obtained there is certainty in determining whether the data represented by the real address is located in the buffer. Although this system has worked admirably it does have its limitations. One of its primary limitations is that in a system such as the IBM System/360 the real address portion that is utilized to keep track of where data is stored in the buffer is limited to the real partition field of the address received by the buffer. Therefore, since the entry is restricted to the real partition field of the address received it is restricted to a fixed number of bits. In the IBM System/360 this would restrict the entry of the buffer directory to a 12 bit real partition field. Due to this restriction of a fixed number of bits to identify a portion of the buffer memory the size of associated segments of the buffer memory are also restricted to the number of bits that are available to identify portions of these associative segments. That is, since in this prior art system the entry that may be stored in the buffer directory which is utilized to identify a corresponding portion of the buffer is restricted to the 12 bit real partition field of the received address, the corresponding associative segment in the cache is also restricted to the number of bytes that can be identified by a 12 bit entry. That is, each associative segment is restricted to 4K bytes ($2^{12} = 4096$ or 4K). Using this prior art method, then the buffer memory must be restricted to the fixed number of bytes that might be identified by the real partition field of the address. As stated above in the System/360 it would be a restriction to 4K bytes.

Although it is possible to design a buffer directory and buffer which is divided into 4K byte segments it becomes quite expensive as the overall size of the buffer increases. From a cost standpoint it would be more effective to reduce the number of segments required in the buffer by increasing the capacity of each of these segments but this has not been possible due to the above restriction in the prior art systems.

It should be noted at this point that the above art system utilized only the real partition field of the received address since this portion of the address is identical in both logical and real addresses. This is shown in FIG. 1 where a logical address and a real address are shown. The logical address contains a U field (bits 8 thru 17), a V field (bits 18 and 19), and an X field (bits 20 thru 26). The real address contains a Q field (bits 8 thru 17), an R field (bits 18 and 19) and an X field (bits 20 thru 26). The X field and bits 27 thru 31 in both the logical and real address are equal when the addresses identify the same data. Bits 20 thru 31 are the real partition field referred to above as the limiting factor on the size of the associative elements that may be used by the prior art system. As can be seen from FIG. 1 if use was made of a field of the received address which was greater than the real partition field (i.e. greater than bits 20 thru 31) that portion of the received address would not be equal in all cases for the logical and real address. For example, if bits 18 thru 26 were used to identify the data, and, therefore, also to increase the size of the associative segments that could be utilized in the cache, a portion of the field would change depending upon the logical address that was utilized to obtain the data. To describe this in another way if bits 18 thru 26 were utilized as the entry to be put in the directory to identify the location that the data is stored in the cache, the location would be dependent upon the bits 18 thru 26. Since bits 18 and 19 of the logical and real address would not necessarily be equal and they would vary depending upon the particular logical address that was being utilized to fetch the data, the data might be stored in several different locations. In this case, since bits 18 and 19 would vary the data could possibly be stored in four different locations within the cache depending upon the value of bits 18 and 19.

If the prior art system were to utilize bits 18 thru 26 to access and store the data into cache, the partition field would be both logical and real. That is, bits 18 and 19 would correspond to a logical address whereas bits 20 thru 26 would correspond to a real portion of the address. Therefore, a block fetch into cache using a partition field correspond to bits 18 thru 26 may be subsequently referred to by a logical address having a different partition field (bits 18 thru 26) but representing the same data. Since no mechanism is provided in the prior art system to enable the system to recognize that both of these addresses refer to the same block of data the second reference would fail to recognize that the block is already resident in cache and consequently fetch the block again. Thus the block fetched into cache by the first address is essentially transparent to references to the same block by other logical addresses. For this reason the prior art system is restricted to bits 20–31 or the real partition field.

In light of the above described problems in the prior art it is a primary object of this invention to allow the use of larger associative segment sizes than those allowed by the prior art systems while maintaining the number of associative segments to a minimum for a fixed buffer capacity.

It is another object of this invention to allow the buffer partition field, that is utilized to identify the storage data in the buffer, to be part logical and part real.

It is a further object of this invention to reduce hardware requirements over prior art system accomplishing the same functions.

It is still a further object of this invention to provide a memory system which utilizes both logical and real portions of the received address to access data in the buffer which will be able to identify this data even though it was initially stored in the buffer under a different logical address.

It is still a further object of this invention to provide an apparatus which will maintain but one copy of data in the buffer even though it has been fetched into the buffer by two different logical addresses.

It is a still further object to be able to recognize a request for a block from some external source, i.e. channel or CPU even though the block may have been fetched into cache using a different address than that used to request the block.

SUMMARY OF THE INVENTION

The above identified objects of the present invention are achieved by maintaining a fetch directory and a broadcast store directory for each buffer that is utilized. The fetch directory is accessed with either the VX field of a logical address or the RX field of a real address. Each entry in the fetch directory contains the field QR of the address of the corresponding block in the cache. The broadcast store directory is always accessed with the RX field of a real address. An entry in the broadcast store directory consists of QV where V is obtained from the logical address that initially fetched this data into the cache. There is an entry in the fetch directory and one in the broadcast store directory for every block resident in the cache.

A block is accessed from cache with the VX field of the logical address. If the block is not found, the real address is broadcast to all caches in the system to include the requesting cache. The RX field of the real address is used to search the broadcast store directory. If a match occurs as a result of the broadcast store search, then the block lies in the associated cache. The partition in which the block resides in cache is defined by VX (where V is obtained from the broadcast store directory.) The segment in which the block resides is identical to the segment in which the match occurred in the broadcast store directory.

If the fetch directory is searched and the desired block is not found in the cache, a replacement algorithm is employed which insures that any modified, valid data which might be resident in the cache is stored into main memory prior to the fetching of the new data as well as insuring that the appropriate broadcast store directory and fetch directory entries are updated to insure that only one copy of the data is maintained within the cache.

BRIEF DESCRIPTION OF THE DRAWINGS

Referring to FIG. 2, a multiprocessing system of the form contemplated by the present invention includes a plurality of processors 101, each containing its own buffer memory 102. Each of these processors 101 is connected by its bus 103 to a memory control unit 106. Memory control unit 106 controls access and priority of service to the main memory 109, and controls communications with the other memory control units 106. Each memory control unit 106 may have connected to it an input/output (I/O) channel 105 connected by a bus 104. Additionally, each of the memory control units 106 is connected to each adjacent memory control 106 by an inter control unit bus 107. Each of the memory control units 106 is also connected to the main memory 109. It should be noted that the processor 101 described in this invention could be a single uniprocessor as well as a more complex pipeline processor that is simultaneously processing a plurality of instruction streams with the instruction streams sharing the resources of a buffer memory 102.

Figure 2:
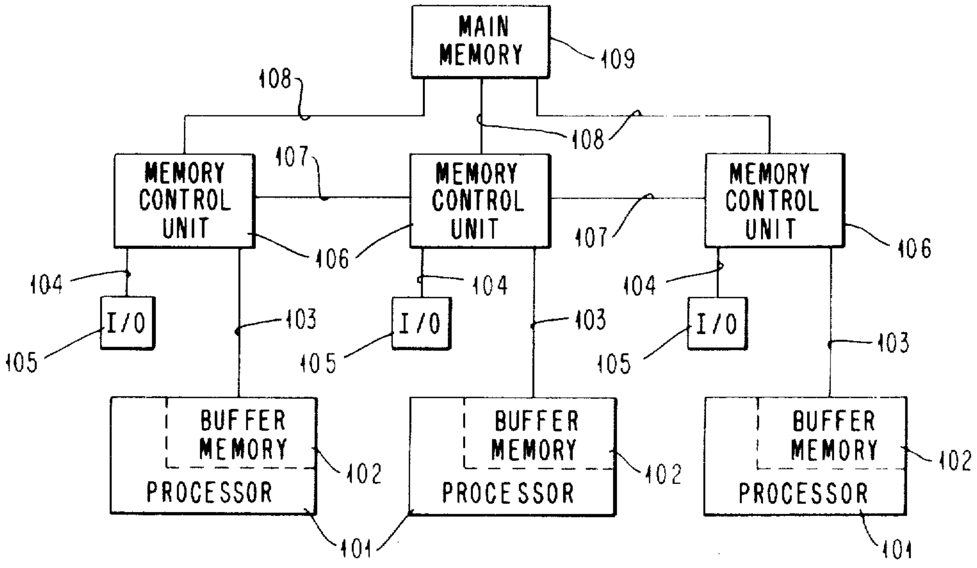
FIG. 2 shows a schematic diagram of the data processing system which employs the present invention.

The system of FIG. 2 also contains a memory control system which allows one modified copy of data to exist within a buffer memory 102. A broadcast system is utilized to provide each processor 101 the capability of querying each other processor 101 to determine whether a modified (i.e. updated) version of the desired data is located in another buffer memory 102. If a modified version of the data is found to be in another buffer memory 102, it is transferred to the requesting processor 101 via the main memory 109. Using this system, which only allows one buffer memory 102 to contain a modified version of any data item, the requesting processor 101 obtains the most current data in one main memory cycle. The operation of this memory control system is more fully described in the application entitled "Memory Control in a Multiprocessing System Utilizing a Broadcast" by Robert P. Barner, et al. Ser. No. 179,376, filed Sept. 10, 1971 and assigned to the same assignee as the present application. That application is incorporated into the present application by reference.

Figure 3:
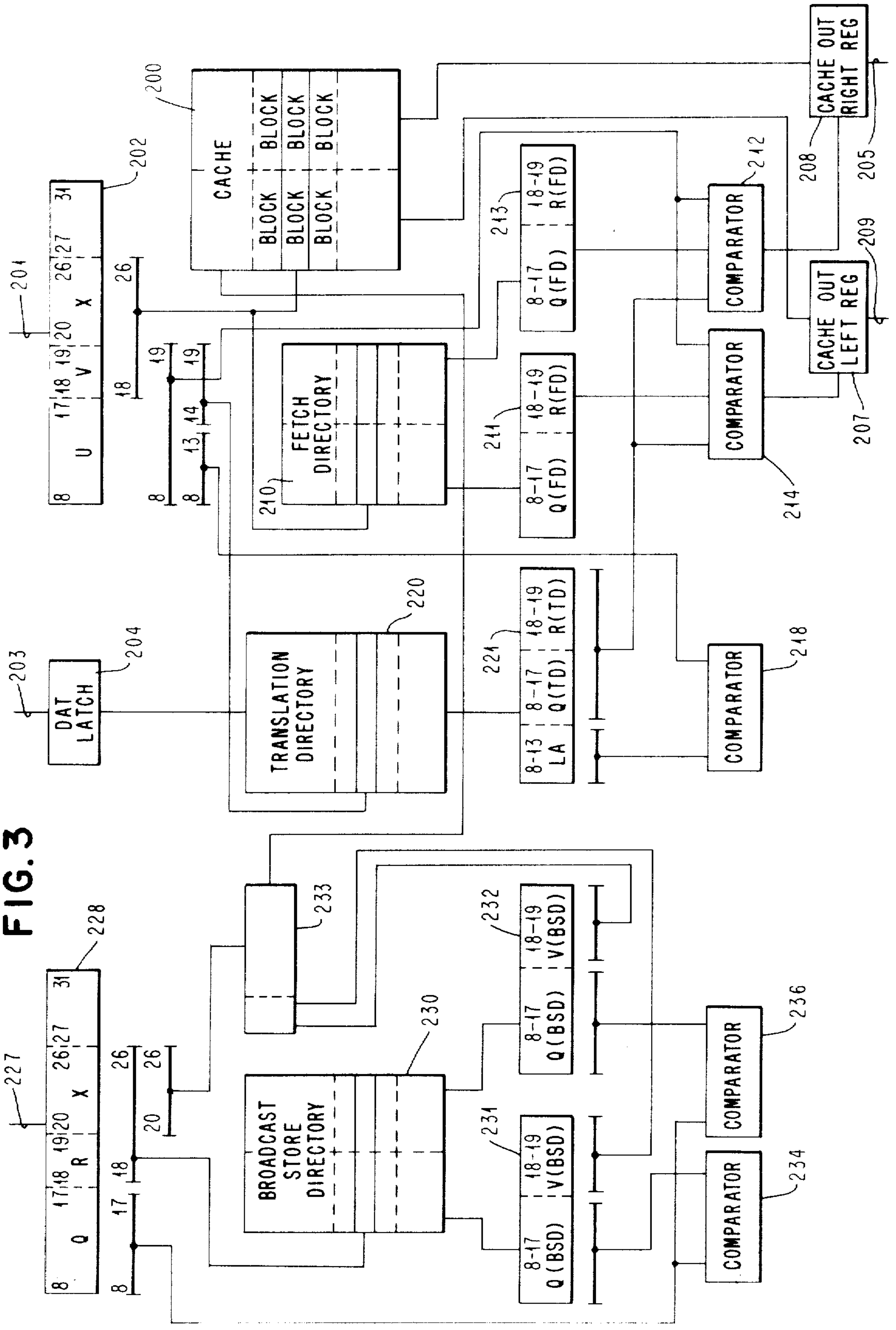
FIG. 3 shows a detailed schematic diagram of the apparatus which is utilized in the present invention.

Referring now to FIG. 3, a more detailed description of the buffer memory 102 will be given.

Generally, the buffer memory 102 is designed to support the processor 101 by providing storage functions at a speed much greater than that of the main memory 109. It supplies copies of the most recently used data to the processor 101, stores away updated blocks, maintains records consisting of the status and disposition of data, and communicates its activities to other buffer memories 102 via the broadcast mechanism referred to above.

As shown in FIG. 3, the principal component of the buffer memory 102 are the primary storage module called the cache 200, the fetch directory 210, the translation directory 220, and the broadcast store directory 230.

Although the buffer memory 102 may be organized in various ways, the buffer memory 102 embodiment of this invention is divided into left and right segments within the cache 200. Each of these segments contains 512 partitions. Each partition is 64 bytes, 32 associated with each segment in cache 200. The partition represents a direct mapping between buffer memory 102 and main memory 109. A block in main memory 109 may reside in either of the two block segments for that partition in cache 200. This mapping scheme is termed 2-way set associative. It will be obvious to those skilled in the art that many types of mapping schemes might be employed in the buffer memory 102 and that this invention is not restricted to this type of mapping.

The system architecture of the present embodiment utilizes a system address, bits 8–31, which identifies the partition by bits 8–27 and the byte by bits 28–31. The segment is identified by comparing the system address 8–19 with the contents of the fetch directory 210 which is organized with similar parameters as cache 200.

Figure 4:
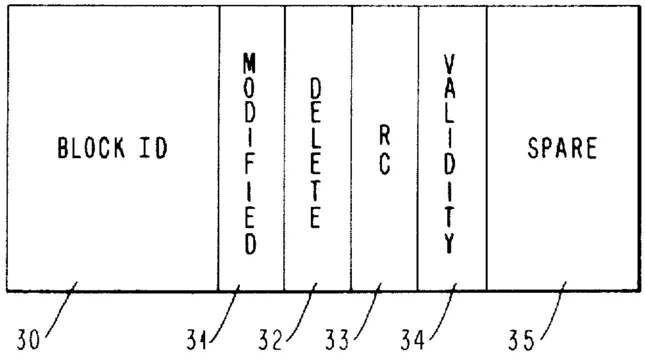
FIG. 4 shows a diagram of the format of an entry in the fetch directory.

The fetch directory 210 is a table of contents that identifies and classifies data stored in the cache 200. The fetch directory 204 maintains a copy of each reside block address and provides searches for all processor initiated data fetches from cache 200. The fetch directory 210, is similar in organization to cache 200. There is one 16 bit entry per cache block. The fetch directory 210 partition address bit are the same as cache 200, discussed above. Referring to FIG. 4, the 16 bits in each entry in the fetch directory 210 contains the following fields:

1. 12 block ID bits 30, which correspond to system address bits 18–19 and identify the main storage block resident in the corresponding cache 200 entry.
2. one modified bit 31, indicates that the block resident in that cache entry has been altered by the program.
3. one delete bit 32, that donates that this block will not be replaced.
4. one RC bit 33, used to decode the segment to be replaced if a directory miss occurs during an access.
5. one validity bit 34, indicates that a main storage block is resident in a cache block.

The modified bit 31 and validity bit 34 provides means to insure only a single valid modified version of data may exist within one of the buffer memories 102. How this is accomplished is fully explained in the above cited Barner, et al. application.

The broadcast store directory 230 is used to determine the cache 200 status for all broadcast searches. The broadcast store directory 230 is similar in organization to the cache 200. The broadcast store directory 230 entry bits are the same as those described above for the fetch directory 210.

The translation directory 220 contains the necessary information to translate logical addressing to real addresses. The translation directory 220 is an associative array which contains 64 entries. Each entry consists of bits 8 thru 13 of the logical address and bits 8 thru 19 of the real address which the logical address portion corresponds to. The entries into translation directory 220 are provided from main memory as a translation of a logical address to a real address is required.

Cache address register 202 provides the means to receive addresses from the processor 102 over 201. The cache address register 202 is connected to the cache 200, translation directory 220 and fetch directory 210 as well as comparators 218, 212, and 214 in order to provide various portions of the received address to the various devices.

Figure 1:
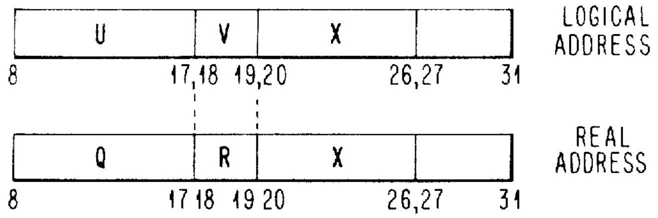
FIG. 1 shows a diagram of the format of the logical and real addresses that are used in the prior art and present systems.

Dynamic address translation DAT latch 204 provides the means to indicate whether the received address in the cache address register 202 requires address translation. This latch is set by resources in processor 102 when a logical address is transmitted over bus 201 to cache address register 202. This might be accomplished by the program that the processor 102 is executing or by a portion of a program status work that is stored in the processor 102. In any event, a signal is sent over bus 203 from the processor 102 to set DAT latch 204 when address translation is required. DAT latch 204 is connected to translation directory 220 in order to provide the indication to the translation directory 220 that address translation is required. Broadcast address register 228 provides a means to receive addresses from memory control unit 106 over bus 227 which is a portion of bus 103 of FIG. 1. Various portions of the broadcast address register 228 are connected to the broadcast store directory 230 comparators 234, 236, and concentration register 233.

Cache out left register 207 and cache out right register 208 are provided to receive the output of the left and right hand segments, respectively, of the cache 200 during a cache access. In a similar manner, fetch directory out left register 211 and fetch directory out right register 213 receive the output of the left and right segments, respectively, of the fetch directory 210 as the result of a fetch directory 210 access. Translation directory out register 221 receives the output of the translation directory 220 as a result of a translation directory 220 access. Additionally, broadcast store directory left output register 231 and broadcast store directory right output register 232 receive the output of the left and right segments, respectively, of the broadcast directory 230 as a result of a broadcast store directory 230 access.

Comparator 214 and comparator 212 provides means to compare the real address portion of the fetch directory 210 output for the left and right segments, respectively, with the real address portions of the address within the cache address register 202 in the case where a real address is resident in the cache register 202 or with the real address portion of the translation address which results from the translation directory 220 access and is resident in the translation directory out register 221 in the case of a logical address being resident in cache address register 202. Comparator 214 and comparator 212 are also connected to cache out left register 207 and cache out right register 208, respectively, and provide a means to control the gating of data from these registers in the event that the desired data is resident within these registers.

Comparators 218 provides a means to compare the logical address output resulting from the translation directory 220 access from translation directory out register 221 with the logical address portion of the address resident in the cache address register 202 when a logical address is resident within the cache address register 202.

Comparator 234 and comparator 236 provide means to compare the real address portion of the broadcast store directory 230 entry which is read out of the left and right segments, respectively, with the real address portion of the entry in the broadcast register 228 that was used to search the broadcast store directory 230.

Concatenation register 233 is connected to the broadcast address register 228 and the broadcast store directory out left register 231 and the broadcast store directory out right register 232 the concatenation register allows the combination off a portion of the address in the broadcast register 228 with a portion of the appropriate entry read out of the broadcast store directory 230 in order to form a new address for accessing cache 200.

OPERATION

The operation of the invention will now be described utilizing the 24 bit addressing described above with a 4K byte page size and a 1M byte segment size. A similar mechanism to that described, as would be obvious to one of skill in the art, could be employed for different page and segment sizes.

The operation of the system will be described utilizing the schematic diagram of FIG. 3 and the system flow chart shown in FIG. 5. The first type of operation to be described will be the receipt of a logical address from the processor. The logical address that is desired by the processor is transmitted over bus 201 to cache address register 202. For the purposes of this description bits 8–17 will be referred to as the U field, bits 18–19 as the V field, and bits 20–26 as the X field. These fields may be either a portion of a real or a logical address depending upon the setting of the DAT latch 204 as described above. Upon receipt of the logical address and the cache address register 202 and an indication that DAT latch 204 has been set indicating a logical address is resident in the cache address register 202 the translation directory 220 is accessed. Bits 14–19 of the logical address in cache address register 202 are used to address a translation directory 220 entry. It should be noted that the indexing of the translation directory is completely nonassociative and that bits 14–19 will address but one entry in the translation directory 220. The function of the translation directory 220 is to map the high order 12 bits of a logical address (i.e. bits 8–19) into the high order 12 bits of the real address which corresponds to that logical address. Since the low order 12 bits of the address specifies the byte within a page, they are invariant under address translation and, therefore, need not be considered. An entry in the translation directory 220 contains the 12 high order bits (i.e. bits 8–18) of the real address as well as bits 8–13 of the logical address to which this entry corresponds. For the purposes of this description the high order bits of the real address that are resident within a translation directory 220 entry will be represented as Q(TD) to represent bits 8–17 of the real address entry and as R(TD) to represent bits 18–19 of this real address entry. Since any logical address with identical bits 14 to 19 will map into the same location of the translation directory 220, only those bits are required to address the translation directory 220. Additionally since any logical address with identical bits 14 to 19 will map into the same location into the translation directory 220, bits 8 to 19 of the logical address are required to be maintained within each entry in order to identify which logical address has used this entry most recently. The entry specified by bits 14–19 of the logical address is gated to translation directory out register 221.

Figure 5:
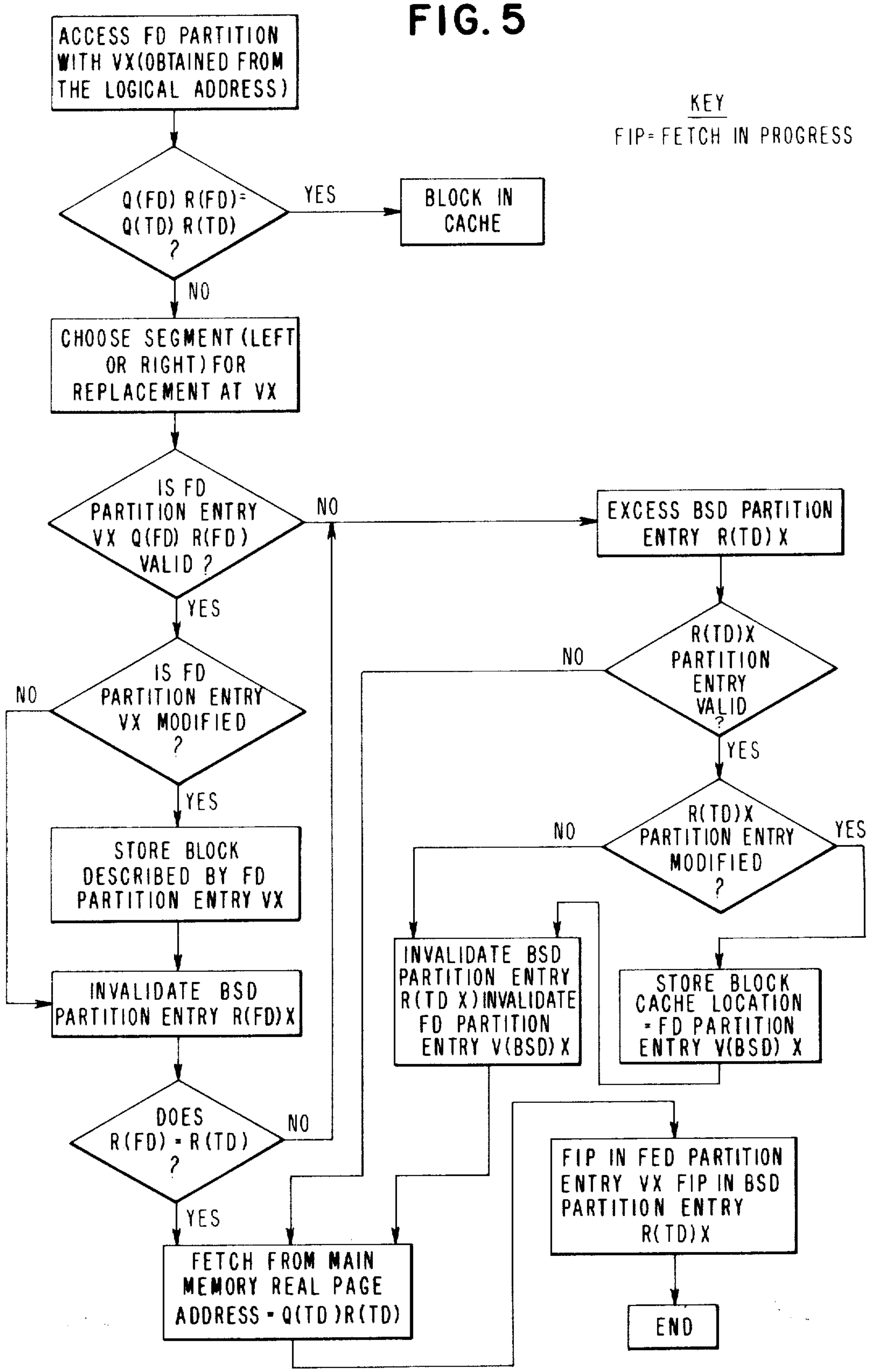
FIG. 5 shows a flow diagram of the operation of the present invention.

Simultaneously with the access of the translation directory 220 as shown in step 1 of FIG. 5 the fetch directory 210 and the cache 200 are also accessed. Bits 18 to 26 of the logical address resident in the cache address register 202 are used to index the 512 entry pairs of both the cache 200 and the fetch director 210. Each entry of the fetch directory 210 contains bits 8 to 19 of the real address of the corresponding block in the cache 200. These bits will be identified as Q(FD) for bits 8–17 and R(FD) for bits 18–19. As a result of the fetch directory 210 access the entry resident in the left and right segments of the address specified by bits 18–26 of the address in the cache address register 202 are gated to the fetch directory out left register 211 and the fetch directory out right register 213, respectively. Simultaneously the block of data resident in the left and right segment of the cache 200 entry specified by the bits 18–26 in the cache address register 202 are gated to the cache out left register 207 and the cache out right register 208, respectively.

During the cache 200 access, bits 8 to 13 of the logical address field in the cache address register 202 are compared in comparator 218 with bits 8 thru 13 of the logical address that was resident in the accessed translation directory 200 entry which had been gated to translation directory out register 221.

If the comparison in comparator 218 indicates that the fields are unequal, then an access must be made to segment and page tables in order to find the correct real address for the logical address register resident in cache address register 202. This is accomplished in the normal manner known to those skilled in the art of fetching the appropriate translation key from its appropriate table. This might be accomplished in several different ways such as maintaining the conversion keys in the main memory. Upon obtaining the appropriate conversion for the logical address it is loaded into the translation directory 220 at its appropriate address determined by bits 14–19 of the logical address that is being converted. Upon loading of the correct logical to real address transformation into the translation directory 220 it is necessary to reaccess the translation directory 220 in order to obtain the proper address transformation. This is accomplished in the same manner described above where bits 14–19 of the logical address resident in cache address register 202 are used to address the appropriate entry of the translation directory 220 and the appropriate entry is gated into translation out directory register 221. The comparison in comparator 218 of bits 18–13 of the logical address resident in translation directory out register 221 with bits 8–13 of the logical address resident in the cache address register 202 is repeated.

If the comparison in comparator 218 indicates that the fields being compared are equal, that is, there is a translation directory hit, the real address bits in the translation directory entry that is resident in translation directory out register 221 are compared to the real address bit in both entries of the fetch directory 210 that have been gated to the fetch directory out left register 211 and the fetch directory out right register 213. These comparisons are accomplished in comparator 214 and comparator 212. That is, Q(TD)R(TD) which is resident in translation directory out register 221 is compared with the Q(FD) R(FD) entries in fetch directory out left register 211 and fetch directory out right register 213 in comparator 214 and comparator 212, respectively. This is shown in FIG. 4 as step 4. A comparison with either of the fetch directory 210 entries means that the data in the cache 200 block corresponding to the fetch directory 210 entry corresponds to that identified by the logical address resident in the cache address register 202. In this case the comparator that achieves the comparison gets the contents of the appropriate cache out register to the processor. That is, if comparator 214 achieves a comparison it gates the contents out of cache out left register 207 over bus 209 to the processor 102. And in a similar manner, if comparison is achieved in comparator 212 it gates the contents out of cache out right register 208 over bus 205 to the processor. It is not possible for both entries in the fetch directory 210 to compare with the logical address since the data represented by the real address can only map into one segment of the cache 200. That is, the data represented by the real address could not be present in both segments of the cache 200. If either entry read out from the fetch directory 210 does not compare with the real address portion gated from the translation directory, then the requested data is not resident at the location pointed to by bits 18–26 of the address in cache address register 200, and a broadcast for the block must be initiated.

In the event that the address that the processor requests is a real address the operation is similar to that described above for a logical address with the major exception that the translation directory 220 operation is not required. When the real address is gated into cache address register 202 the DAT latch 204 will not be set by the processor since address translation will not be required since it is a real address and not a logical address that is being transmitted from the processor 101. Bits 19 thru 26 of the real address in cache address register 202 are used to index the cache 200 and the fetch directory 210 in a manner similar to that described above for a logical address. The address entries in the fetch directory 210 for the left and right segments are gated out to the fetch directory out left register 211 and the fetch directory out right register 213, respectively. Concurrent with this operation the addressed entries of the cache left and right segments are gated out to the cache out left register 207 and the cache out right register 208, respectively. Since the address in the cache address register 202 is a real address, bits 8 thru 19 of the address in the cache address register 202 are compared to the real address bits in both entries of the address fetch directory 210 entries. That is, bits 8 thru 19 of the address in the cache address register 202 are compared with the contents of fetch directory output left register 211 in comparator 214 and with the contents of fetch directory out right register 213 in comparator 212. As described for an logical address, if a comparison with either of the fetch directory 210 entries is achieved, this indicates that the data in the corresponding block of the cache 200 corresponds to that identified by the real address resident in the cache register 202. In a manner similar to that described above for the logical address if comparison is achieved, the data associated with the segment in which comparison was achieved is gated to the processor 101. Also in a manner as described above for a logical address if comparison is not achieved in comparator 212 or comparator 214 the requested data is not resident in cache 200 at the location pointed to by bits 18–26 of the address in the cache address register 202 and a broadcast for the requested block must be initiated.

Where a broadcast for data is required, the real address is transmitted to the memory control unit 106 where it is broadcast to main memory 109 as well as to all buffer memories 102, including the requesting buffer memory 102, for the sake of fetching the requested data. This broadcasting operation and how it is performed is more fully described in the above reference Barner, et al. application. Since the data can be specified uniquely by its real address, it is the real address which is broadcast under all circumstances. Therefore, when a broadcast for data is being performed, it is the real address which is received over bus 227 into broadcast address register 228. For the purposes of this description, the various fields in the address in the broadcast address register 228 will be represented as Q for bits 8 thru 17, R for bits 18–19 and X for bits 20–26. Bits 18 thru 26 (RX) of the real address are used to index the broadcast store directory 230 upon initiation of a broadcast operation. Each entry in the broadcast store directory 230 corresponds to a ten bit real address field and corresponds to the high order ten bits Q of the real address for the address stored in the corresponding entry in cache 200. Each entry in the broadcast store directory 230 also contains a 2 bit field, V(BSD), which corresponds to bits 18 and 19 of the logical address which fetched the corresponding block into the cache 200. Therefore, upon access to the broadcast store directory 230 by bits 18 thru 26 of the real address contained in the broadcast address register 228, the two entries corresponding to the left and right segments of the broadcast store directory 230 are gated to the broadcast store directory out left register 232, respectively. The contents of each of these registers will be represented as Q (BSD) which as stated above, corresponds to the real address bits 8–17 of the data stored in an entry in the cache 200 while V (BSD) corresponds to bits 18 and 19 of the logical address which fetched that entry into cache 200. The Q (BSD) field in the broadcast store directory out left register 231 and the broadcast store out right register 232 is compared with the Q field from broadcast address register 228 in comparator 234 and comparator 236, respectively. A match in either comparator indicates that the block is in cache 200. The V (BSD) X will define the cache 200 partition in which the block desired resides. Therefore, when a comparison is indicated in either comparator 234 or comparator 236 the V (BSD) field residing in the broadcast store directory out register associated with the comparator in which the comparison was indicated is gated to concatenation register 231 simultaneously with the transfer of the X field of the address in broadcast address register 228 to the concatenation register 233. The contents of the concatenation register 233 will provide the cache partition in which the desired block resides and will be gated to access the desired data within cache 200.

The preceding discussion has generally considered cases in which the desired data was in the cache 200 at the location pointed to by the address in the cache address register 202. Where the data is not within the cache at this location the following occurs.

In the situation where the buffer memory 102 is accessed by a logical address and the address is not located in the translation directory 220 the translation directory 220 must be loaded with the correct real address transformation as discussed above. Once the real address is known the cache 200 and the fetch directory 210 can be accessed by the process described above to see if the desired block is in the cache 200.

When the entry for the desired block is not found in the fetch directory 210 partition identified by the VX field of the address within the cache address register 202, then the following procedures are followed.

First the desired block must be fetched into the partition of the cache 200 identified by the VX field. Another block of data may, however, presently reside in that partition of the cache 200. Therefore, if the block of data that is resident in the VX partition of a cache 200 is a modified valid form (indicating that it is the most current copy of this data within the computing system) it must be transferred to main memory 109. If however, the undesired data resident in the VX partition of the cache 200 is either invalid or unmodified it will not be necessary to store this data to main memory 109 or another buffer memory 102. Therefore, when the output of the fetch directory 210 indicates that the data resident in the VX partition of the cache 200 is modified a store of this block of into main memory 109 is initiated. Additionally, the entry in the broadcast store directory 220 indicates that this undesired data is invalid, no action will be required since the new data may be merely read into the cache 220 destroying the previously resident data. In the event that the fetch directory 210 search indicates that the data is unmodified it will be necessary to invalidate the entry in the broadcast store directory 230 entry identified by $R(FD)$X. The above identified Barner, et al. application explains more fully how the determination of whether the entry in the fetch directory 210 is valid/invalid or modified/unmodified data is accomplished.

Secondly, if the two bits of the partition field $R(TD)$ of the block to be fetched from main memory 109 do not equal the corresponding bits R(FD) of the block presently in the cache partition represented by field VX, the broadcast store directory 230 entry for the block to be fetched will be located at $R(TD)$X and not at $R(FD)$X as it is for the present block. Therefore, if $R(TD) = R(FD)$ no action is required as to examining the broadcast sore directory 230 entries and the third step outlined below, it initiated. If, however, $R(TD)$ is not equal to $R(FD)$ or if the block in the cache 200 entry at VX is invalid, the contents of the broadcast store directory 230 partition identified by $R(TD)$X must be examined. If this entry indicates that the corresponding block is invalid the third step will be initiated. If it indicates that the block is unmodified it will invalidate the fetch directory 210 entry at the partition identified by the V(BSD)X and then go t the third step. Finally if it determines that this entry is modified it will store the block from the cache partition specified by V(BSD)X into main memory 109. It will also invalidate the fetch directory 210 entry at the partition specified by V(BSD)X and go to the third step.

The third step will update the fetch directory 210 partition specified by VX with the real address of the block to be fetched i.e. $Q(TD)R(TD)$. It will also update the broadcast store directory 230 partition specified by $R(TD)$X with the real address of the block to be fetched (i.e. Q(TD)) and the virtual pointer field V. Finally the block identified by the address in the cache address register 202 will be fetched from main memory into the cache 200 at the partition specified by the VX field.

Figure 6:
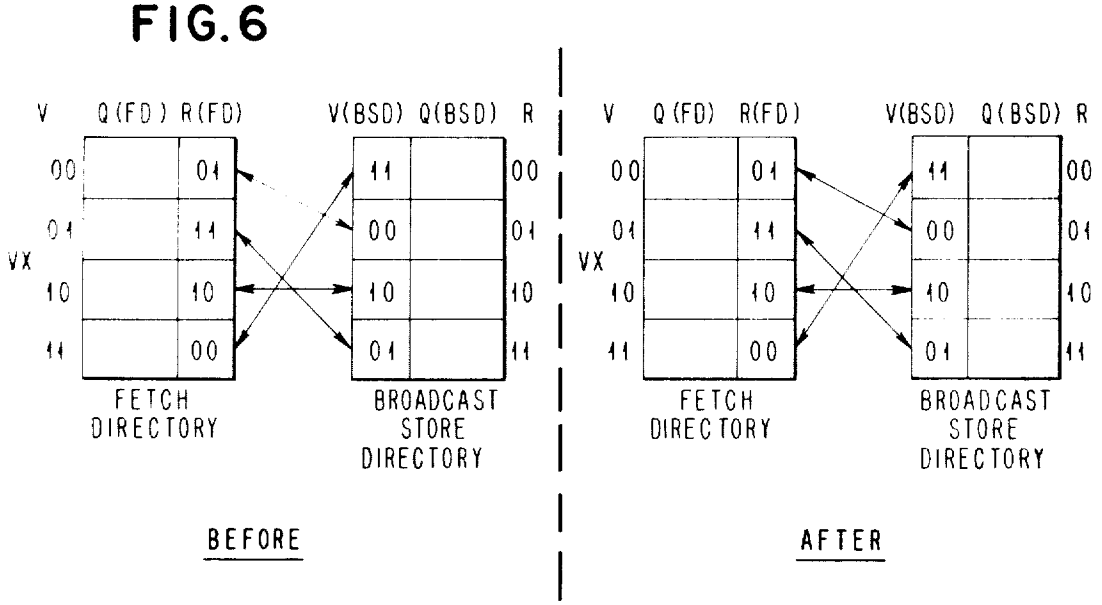
FIG. 6 shows an example of the entries in the fetch directory and broadcast store directory when the R(FD) field of the block being replaced is equal to the R(TD) entry of the new block being fetched.
Figure 7:
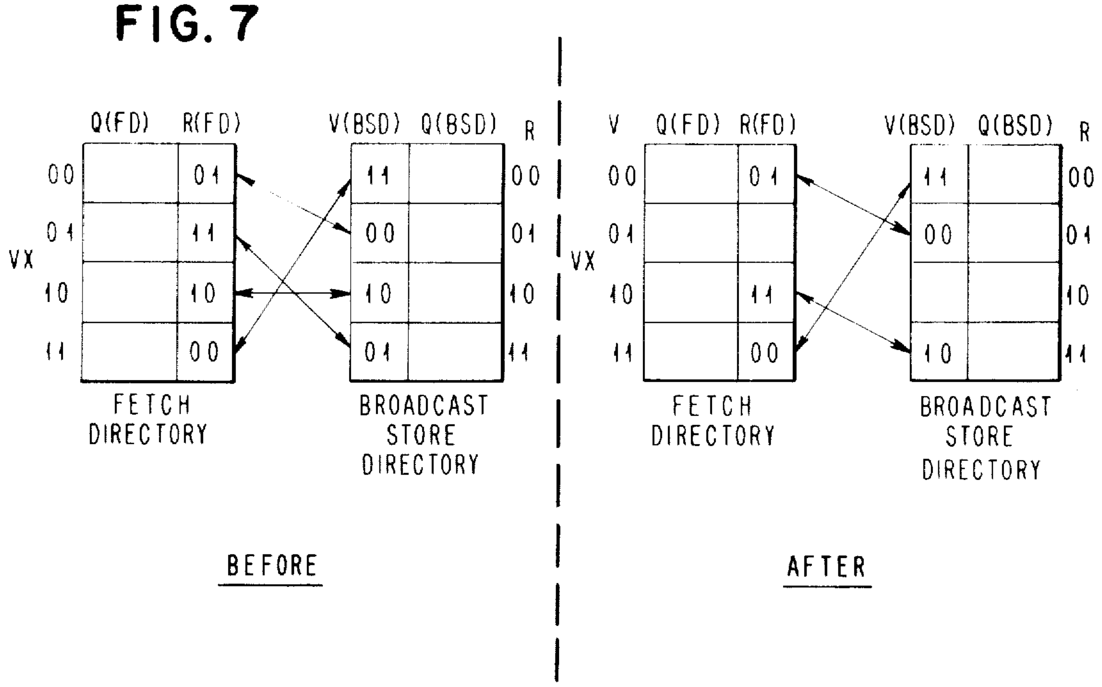
FIG. 7 shows an example of the fetch directory and broadcast store directory entries when the R(FD) field of the block being replaced in cache is not equal to the R(TD) field of the new block being fetched.

In order to illustrate more clearly how the above block replacement and arrangement of the directory entries is accomplished FIGS. 6 and 7 will be utilized. Each of these figures illustrate hypothetical entries in the fetch directory 210 and the broadcast store directory 230. Arrows have been used to demonstrate how the $R(FD)$ and V(BSD) entries in the fetch directory 210 and the broadcast store directory 230, respectively, point to entries in the other directory.

FIG. 6 illustrates the case where $R(FD)$ of the block being replaced in the cache 200 is the same as $R(TD)$ of the new block being fetched. As stated above the new block is fetched from main memory 109. Entries are made in the fetch directory 210 and the broadcast store directory defined by VX and $R(TD)$X, respectively. In the example shown in FIG. 6 the block to be replaced has a logical address such that $VX = 01.X$ and $R(TD)X = 11.X$. As shown in FIG. 6 the $R(FD)$ entry in the fetch directory 210, before block replacement, for $VX = 01.X$ is 11 which equals $R(TD)$. Therefore, after the block is fetched into the cache 200 and the appropriate entries, outlined above, are made into the fetch directory 210 and broadcast store directory 230 the pointers, $R(FD)$ and V(BSD), will be the same. (As shown in FIG. 6). Therefore, no other data stored in the cache will be affected by the block fetch.

FIG. 7 illustrates the more complex case where $R(FD)$ of the block being replaced in cache 200 is different from $R(TD)$ of the new block being fetched.

In FIG. 7 the block to be replaced has a logical address such that $VX = 10.X$ and $R(TD)X = 11.X$. Clearly, then $R(FD)$ which equals 10 does not equal $R(TD)$ which equals 11. Therefore, the entry in the broadcast store directory 230 defined by $R(FD)X$ is invalidated and the corresponding block stored if modified. That is, the 10 entry at $VX = 10$ is invalidated. Next the entry in the broadcast store directory 230 defined by $R(TD)X$ (which FIG. 7 is 11) is read to obtain V(BSD) (which is 01 in FIG. 7). The entry in the fetch directory 210 defined by V(BSD)X is invalidated and the corresponding block store if modified. Therefore, in FIG. 7, the $R(FD)$ entry 11 located at 01 (V(BSD)X) is invalidated. The new block is fetched from main memory 109 and stored into cache 200. An entry is made in the fetch directory at $VX=10.X$ to equal $R(TD)$ (i.e. 11 is entered into $VX=10.X$). Also an entry is made in the broadcast store directory 230 at $R(TD)X=11.X$). The appropriate entries are shown in the after portion of FIG. 7 for the directories after the storage of the new block.

In this manner data which may have been fetched into the cache 200 by a logical address which is different than the address which currently identifies the block is located. Additionally, if the block resides in the cache at a location than that specified by the requesting address, it is moved to the address of the requestor, thereby, insuring that only one copy of a block may reside in a cache at any time.

While the invention has been particularly shown and described with reference to the preferred embodiment thereof, it will be understood by those skilled in the art that various changes in form and details may be made therein without departing from the spirit and scope of the invention.

What is claimed is:

1. A memory system in a data processor, said data processor containing a main memory and a processing unit, comprising:

storage means associated with said processing unit and said main memory for storing selective portions of data from said main memory, register means for receiving from said processing unit an address of desired data in both logical and real form, directory means connected to said storage means and said register means for retaining in both logical and real form a portion of the data address of the data resident in the corresponding portion of said storage means, accessing means connected to said register means and said directory means for accessing said retained portion of data address resident in said directory means and means for determining if said desired data is resident in said storage means irrespective of the address used to store the desired data, whereby the memory system insures that data stored in the storage means may be located irrespective of whether the logical or real address was used to store the data into the storage means.

2. The apparatus of claim 1 wherein said directory means comprises:

a fetch directory that contains a portion of the real data address that fetched each corresponding piece of data into said storage means, and a broadcast store directory that contains a portion of the logical and real data address for each piece of data into said storage means.

3. The apparatus of claim 2 wherein said determining means comprise:

translation means connected to said register means to translate a logical address to a real address, broadcast means connected to said translation means to transmit said translated real address, and real address register means connected to said broadcast means and said broadcast store directory for receiving said transmitted real addresses.

4. The apparatus of claim 3 further comprising replacement means to determine the status of data presently stored in the desired data address location, storing the presently stored data into said main memory if it is found to be in a valid modified state and storing new data in the just vacated addressed location.

5. The apparatus of claim 4 wherein said replacement means further updates said directory means entries to reflect the location of data in accordance with the logical address which last fetched said data into said storage means.

6. A memory system in a multiprocessor, said multiprocessor containing a main memory and a plurality of processing units, comprising:

a plurality of storage means, one of said storage means associated with each of said plurality of processing units, for storing selective portions of data from said main memory, register means associated with each of said storage means for receiving from said associated processing unit an address of desired data in both logical and real form, directory means associated with each of said storage means connected to said storage means and said register means for retaining in both logical and real form a portion of the data address of the data resident in the corresponding portion of said storage means, accessing means connected to each of register means and each of said directory means for accessing said retained portion of data address resident in said directory means and means for determining if said desired data is resident in said storage means irrespective of the address used to store the desired data.

7. The apparatus of claim 6 wherein each of said directory means comprises:

a fetch directory that contains a portion of the real data address that fetched each corresponding piece of data into said storage means, and a broadcast store directory that contains a portion of the logical and real data address for each piece of data into said storage means.

8. The apparatus of claim 7 wherein said determining means comprise:

a plurality of translation means connected to each of said register means to translate a logical address to a real address, broadcast means connected to each of said translation means to transmit said translated real address, and a plurality of real address register means connected to said broadcast means and said broadcast store directory for receiving said transmitted real addresses.

9. The apparatus of claim 8 further comprising a plurality of replacement means one associated with each storage means to determine the status of data presently stored in the desired data address location, means for storing the presently stored data into said main memory if it is found to be in a valid modified state and storing new data in the just vacated addressed location.

10. The apparatus of claim 9 wherein each of said replacement means further updates said directory means entries to reflect the location of data in accordance with the logical address which last fetched said data into said storage means.

11. The apparatus of claim 10 wherein said broadcasting means is connected to each of said real address register means in all memory systems and transmits said translated real address to the real address register means in all memory systems.

* * * * *